(12) United States Patent
Foege

(10) Patent No.: US 10,054,085 B2
(45) Date of Patent: Aug. 21, 2018

(54) POWER SYSTEM HAVING FUEL-BASED COOLING

(71) Applicant: Progress Rail Locomotive Inc., LaGrange, IL (US)

(72) Inventor: Aaron Gamache Foege, Peoria, IL (US)

(73) Assignee: Progress Rail Locomotive Inc., LaGrange, IL (US)

(*) Notice: Subject to any disclaimer, the term of this patent is extended or adjusted under 35 U.S.C. 154(b) by 617 days.

(21) Appl. No.: 14/625,055

(22) Filed: Feb. 18, 2015

(65) Prior Publication Data

US 2016/0237960 A1    Aug. 18, 2016

(51) Int. Cl.
| | |
|---|---|
| *B61C 5/00* | (2006.01) |
| *F02M 31/20* | (2006.01) |
| *B61C 5/02* | (2006.01) |
| *B61C 5/04* | (2006.01) |
| *F02M 31/04* | (2006.01) |
| *F02M 43/00* | (2006.01) |
| *F02M 31/10* | (2006.01) |
| *F02M 31/18* | (2006.01) |
| *F02M 26/00* | (2016.01) |

(52) U.S. Cl.
CPC .............. *F02M 31/20* (2013.01); *B61C 5/00* (2013.01); *B61C 5/02* (2013.01); *B61C 5/04* (2013.01); *F02M 26/00* (2016.02); *F02M 31/04* (2013.01); *F02M 31/10* (2013.01); *F02M 31/18* (2013.01); *F02M 43/00* (2013.01); *Y02T 10/126* (2013.01)

(58) Field of Classification Search
CPC ........ B61C 5/00; F02M 21/02; F02M 21/025; F02M 21/06; F02M 31/00
See application file for complete search history.

(56) References Cited

U.S. PATENT DOCUMENTS

| | | | | |
|---|---|---|---|---|
| 5,129,599 A * | 7/1992 | Wollen | .................. | B64G 1/402 244/135 R |
| 5,375,580 A * | 12/1994 | Stolz | .................. | F02B 29/0443 123/527 |
| 5,887,567 A * | 3/1999 | White | ...................... | B61C 5/00 123/294 |
| 7,360,368 B2 * | 4/2008 | Fickel | .................... | F02M 21/06 62/50.2 |
| 7,841,322 B2 * | 11/2010 | Bach | ................... | F02B 29/0418 123/480 |
| 7,996,147 B2 * | 8/2011 | Gokhale | ............... | F02D 35/023 60/602 |
| 8,857,162 B2 * | 10/2014 | Brown | .................. | F02M 43/00 60/273 |

(Continued)

*Primary Examiner* — Jason C Smith
(74) *Attorney, Agent, or Firm* — Finnegan, Henderson, Farabow, Garrett & Dunner, LLP

(57) ABSTRACT

A power system is disclosed. The power system may have a cryogenic tank configured to hold a supply of liquid fuel, and an engine configured to combust gaseous fuel. The power system may also have a coolant circuit configured to cool the engine, and at least one heat exchanger isolated from the coolant circuit and configured to receive a fluid passing through the engine. The power system may further have a first fuel line extending from the cryogenic tank to the at least one heat exchanger, and a second fuel line extending from the at least one heat exchanger to the engine.

10 Claims, 3 Drawing Sheets

(56) References Cited

U.S. PATENT DOCUMENTS

| | | | | |
|---|---|---|---|---|
| 8,925,518 B1* | 1/2015 | Riley | ............... | F02B 19/10 |
| | | | | 123/261 |
| 2006/0213488 A1* | 9/2006 | Post | ............... | F02M 55/005 |
| | | | | 123/527 |
| 2013/0333673 A1* | 12/2013 | Frick | ............... | F02M 31/04 |
| | | | | 123/557 |
| 2014/0165587 A1* | 6/2014 | Foege | ............... | F01D 15/005 |
| | | | | 60/780 |
| 2015/0345430 A1* | 12/2015 | Foege | ............... | F02M 21/0215 |
| | | | | 105/61.5 |
| 2016/0237960 A1* | 8/2016 | Foege | ............... | B61C 5/02 |

* cited by examiner

POWER SYSTEM HAVING FUEL-BASED COOLING

TECHNICAL FIELD

The present disclosure relates generally to a power system and, more particularly, to a power system having fuel-based cooling.

BACKGROUND

Internal combustion engines such as diesel engines, gasoline engines, and gaseous fuel-powered engines combust a mixture of fuel and air to generate a mechanical power output that can be used in many different ways for a variety of purposes. Unfortunately, conventional engines are inefficient, and much of the energy of the fuel is wasted in the form of heat. For example, heat can be generated during compression of combustion air directed into the engine or during pumping of fluids (e.g., fuel, air, lubricant, etc.) through the engine. Additional heat is generated directly from combustion of the fuel and air, and is transferred to the engine block and to fluids (oil, coolant, exhaust, etc.) circulating through the block. Most of this heat energy is eventually discharged or otherwise dissipated to the environment.

In addition to efficiency losses associated with heat waste, extra energy must be expended to protect components of the engine from the heat and/or to keep performance of the engine from declining due to the heat. For example, the inlet air must be chilled, jacket water coolant must be circulated through the engine block, engine oil must be cooled, and exhaust temperatures may need to be lowered in order to adequately protect the engine and/or to ensure desired performance. Each of these actions requires extra energy, which reduces the mechanical power output of the engine and further lowers its efficiency.

In gaseous-fuel powered engines, for example natural gas or dual fuel (natural gas and diesel) engines, some or all of the fuel may be stored in liquid form at very cold temperatures. The liquid must be heated to a state of vaporization prior to combustion inside the engines. This heating requires additional energy, which can further lower the efficiency of the engine.

One attempt to improve the efficiency of a gaseous fuel powered engine is disclosed in U.S. Pat. No. 7,360,368 of Fickel et al. that issued on Apr. 22, 2008 ("the '368 patent"). Specifically, the '368 patent discloses an engine that combusts fuel drawn from a cryogenic fuel tank. The engine has an exhaust gas recycling device, and a radiator coupled to chill fluid directed through an engine coolant circuit to the exhaust gas recycling device. The engine also has a vaporizer coupled to the fuel tank via a fuel heating circuit. The engine coolant and fuel heating circuits are thermally connected to each other via a heat exchanger, such that heat from the exhaust gas recirculation device is used to vaporize fuel in the vaporizer prior to consumption of the fuel by the engine.

Although the engine of the '368 patent may have improved efficiency through the dissipation of heat from the exhaust gas recycling device to the vaporizer, it may still be less than optimal. In particular, because the exhaust gas recycling device is thermally connected to the engine coolant circuit, in addition to the fuel heating circuit, it may be difficult to control either the temperature of the exhaust gas recycling device or the fuel.

The disclosed power system is directed to overcoming one or more of the problems set forth above and/or other problems of the prior art.

SUMMARY

In one aspect, the present disclosure is directed to a power system. The power system may include a cryogenic tank configured to hold a supply of liquid fuel, and an engine configured to combust gaseous fuel. The power system may also include a coolant circuit configured to cool the engine, and at least one heat exchanger isolated from the coolant circuit and configured to receive a fluid passing through the engine. The power system may further include a first fuel line extending from the cryogenic tank to the at least one heat exchanger, and a second fuel line extending from the at least one heat exchanger to the engine.

In another aspect, the present disclosure is directed to a train consist. The train consist may include a tender car having a cryogenic tank configured to hold a supply of liquid fuel, and a locomotive having an engine configured to combust gaseous fuel. The train consist may also include a coolant circuit configured to cool the engine, an exhaust manifold extending from the engine to the atmosphere, and an intake manifold extending from the atmosphere to the engine. The train consist may further include an EGR passage connecting the exhaust and intake manifolds, at least one heat exchanger isolated from the coolant circuit and disposed in the EGR passage, a first fuel line extending from the cryogenic tank to the at least one heat exchanger, and a second fuel line extending from the at least one heat exchanger to the intake manifold. The train consist may additionally include an accumulator disposed in the second fuel line, and a regulator disposed in the second fuel line downstream of the accumulator.

In yet another aspect, the present disclosure is directed to a method of cooling an engine. The method may include directing coolant through the engine to cool the engine, and directing heated fluid from the engine to transfer heat to a fuel to vaporize the fuel. The method may also include thermally isolating the heated fluid from the coolant, and directing fuel vaporized with heat from the heated fluid into the engine for combustion.

DETAILED DESCRIPTION

Figure 1:
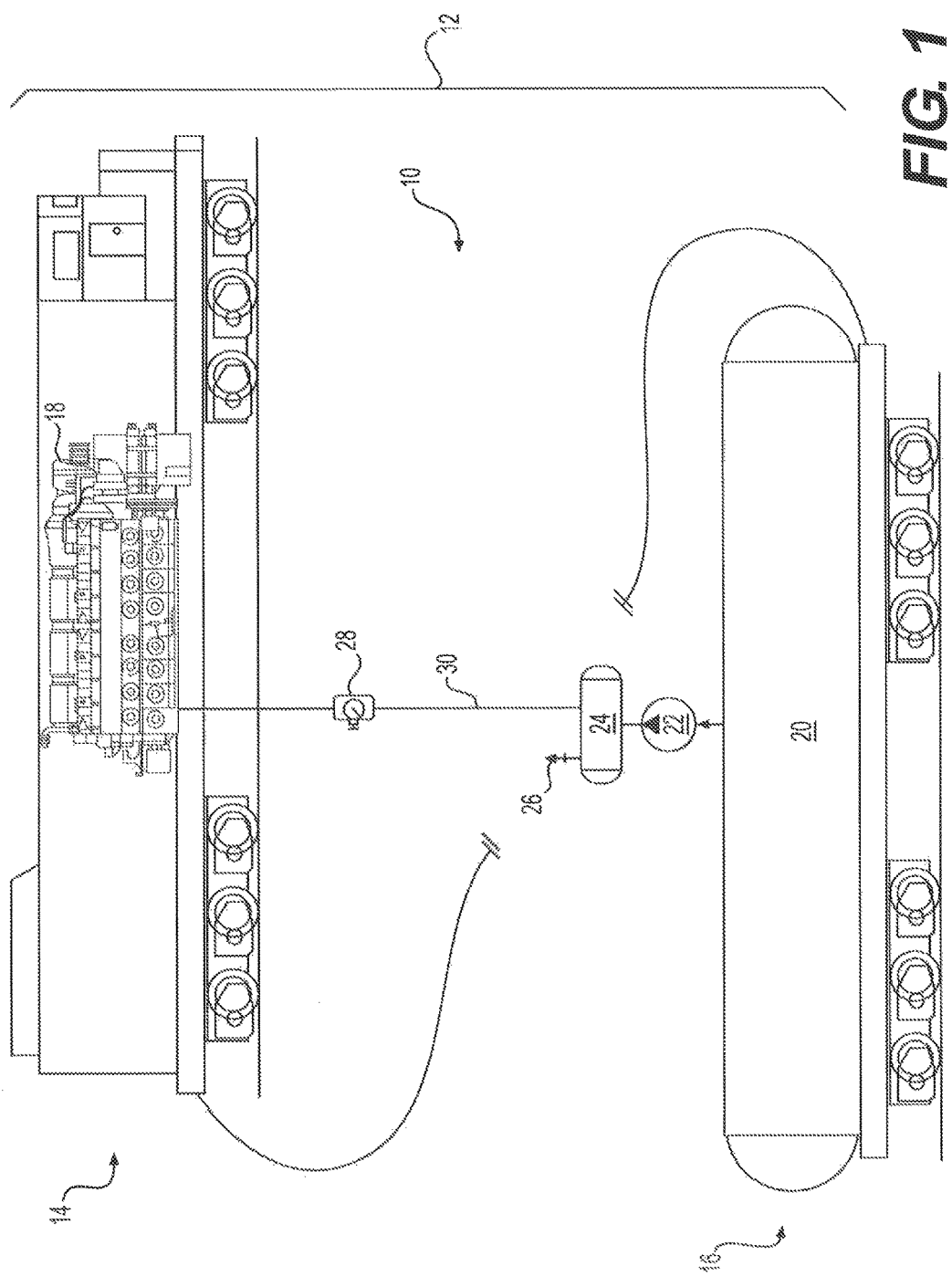
FIG. 1 is a diagrammatic illustration of an exemplary disclosed machine.

FIG. 1 illustrates an exemplary power system 10. In this embodiment, power system 10 is associated with a mobile application, specifically a train consist 12. Train consist 12 may have one or more locomotives 14 and a tender car 16. Locomotive 14 may be coupled to tow tender car 16, and tender car 16 may be configured to provide one or more engines 18 of locomotive 14 with fuel. It should be noted, however, that power system 10 could be associated with other mobile or stationary applications, as desired.

Multiple components may cooperate to deliver a gasified fuel (e.g., natural gas) to engine(s) 18 in a regulated manner. These components may include, among other things, a tank 20 of liquid fuel located onboard tender car 16, a pump 22 configured to draw fuel from tank 20, a high-pressure accumulator 24 configured to hold a supply of gaseous fuel, and one or more pressure regulating devices fluidly connected to accumulator 24. In the disclosed embodiment, two pressure regulating devices are shown, including a vent 26 and a regulator 28. Vent 26 may be located to selectively vent accumulator 24 to the atmosphere, while regulator 28 may be disposed within as supply line 30 that connects accumulator 24 to engine(s) 18. Regulator 28 may be configured to regulate a pressure of the gaseous fuel directed to engine(s) 18.

Tank 20 may embody a cryogenic tank configured to hold the natural gas in a liquefied state. In the exemplary embodiment, tank 20 is an insulated tank that maintains a temperature of the natural gas below a boiling temperature of about −165° C. It is contemplated that tank 20 may be provided with conventional equipment for handling liquefied natural gas (LNG), for example chillers, circulators, heaters, ventilators, etc, as required.

Pump 22 may be any type of pump known in the art for handling natural gas in its liquid state (LNG) and/or gaseous state. In particular, at any point between tank 20 and accumulator 24, some or all of the LNG may gasify. In the disclosed exemplary embodiment, the LNG is gasified downstream of pump 22, and pump 22 is configured to handle only LNG. In this embodiment, pump 22 includes a fixed-displacement pumping device (e.g., a piston, diaphragm or rotor pump) that is powered by a variable speed drive. With this configuration, although the displacement of pump 22 may be fixed, the output of pump 22 may still be varied by selectively adjusting the speed of the drive. It is contemplated that other types of pumps may alternatively be utilized to push natural gas through supply line 30, if desired, for example a variable-displacement pump.

Accumulator 24 may embody a high-pressure vessel configured to store pressurized natural gas for future use by engine(s) 18. As a pressure of the natural gas from pump 22 exceeds a pressure of accumulator 24, the natural gas may flow into accumulator 24. Because the natural gas therein is compressible, it may act like a spring and compress as more natural gas flows in. When the pressure of the natural gas in supply line 30 drops below the pressure of accumulator 24, the compressed natural gas may expand and exit accumulator 24. It is contemplated that accumulator 24 may alternatively embody a membrane/spring-biased or bladder type of accumulator, if desired.

Vent 26 and regulator 28, while used for different purposes, may function in a similar way. Specifically, vent 26 may be configured to selectively allow gaseous fuel to discharge from accumulator 24 to the atmosphere in a controlled manner (i.e., at a control pressure and temperature) that does not compromise the integrity of vent 26. Regulator 28 may similarly allow gaseous fuel to discharge from accumulator 24 in a controlled manner. In contrast to vent 26, however, regulator 28 may direct the discharging gaseous fuel to engine(s) 18 via supply line 30. It is contemplated that vent 26 and regulator 28 may control the gaseous fuel to discharge at the same rates and pressures or at different rates and pressures, as desired.

Figure 2:
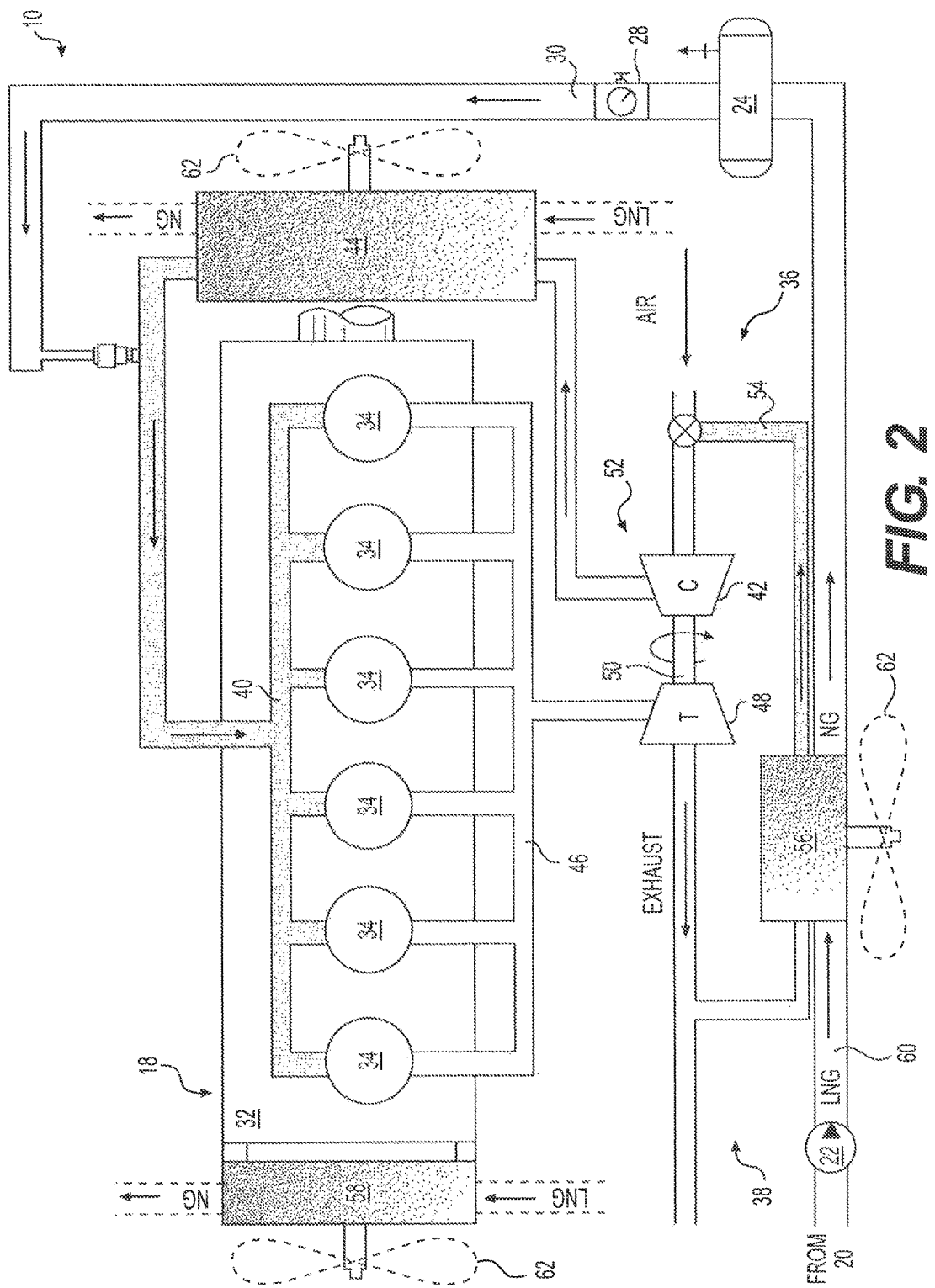
FIGS. 2 and 3 are diagrammatic illustrations of an exemplary disclosed power system that may form a part of the machine of FIG. 1.
Figure 3:
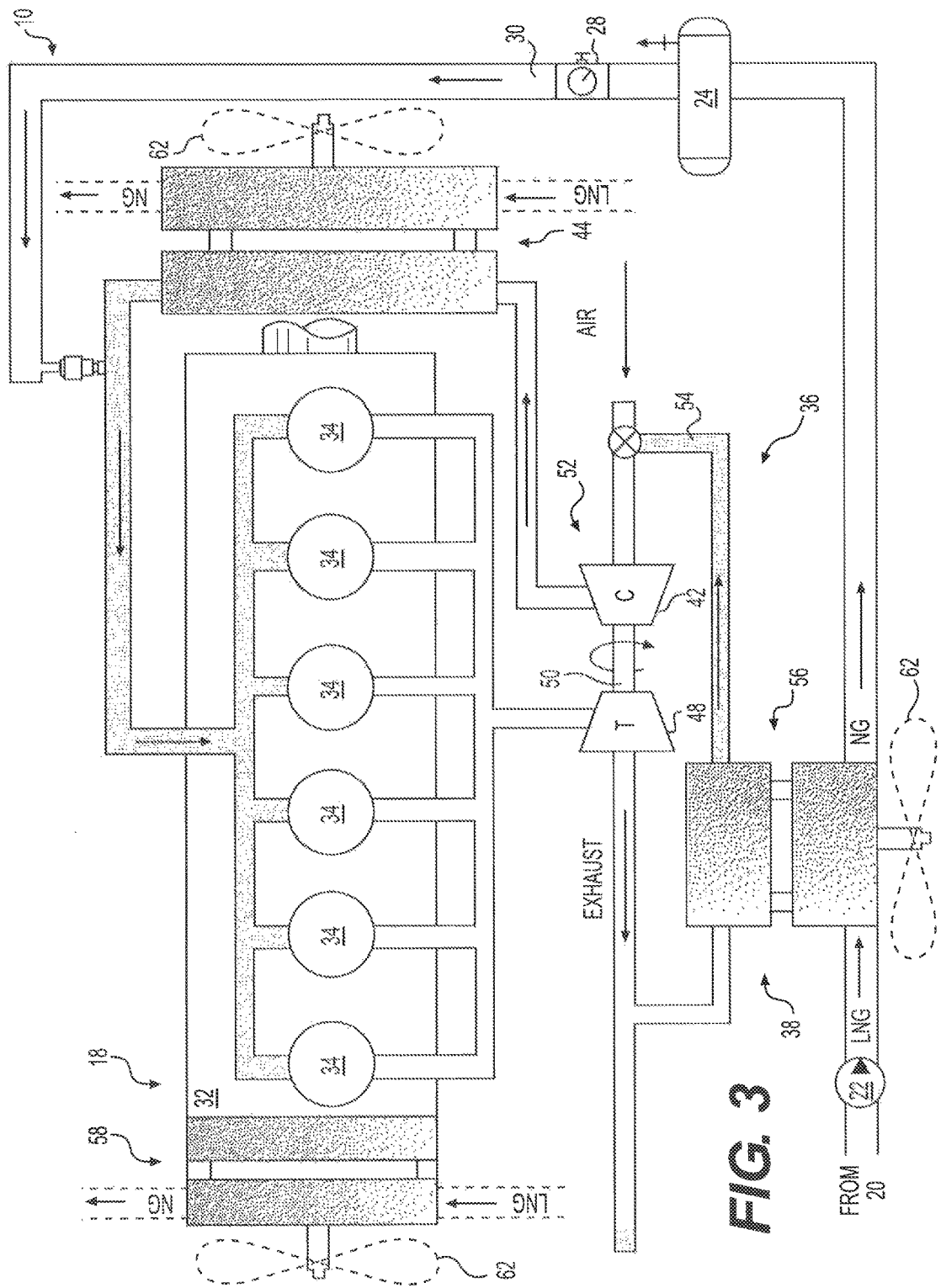

FIGS. 2 and 3 illustrate exemplary arrangements of power system 10 showing various fluid flows associated with engine 18. For the purposes of this disclosure, engine 18 is depicted and described as a four-stroke natural gas engine. One skilled in the art will recognize, however, that engine 18 may be any other type of combustion engine such as, for example, a two-stroke natural gas engine, a two- or four-stroke engine configured to burn another type of gaseous fuel (e.g., hydrogen, methane, etc.), or a two- or four-stroke dual-fuel engine configured to burn diesel fuel and gaseous fuel. Engine 18 may include, among other things, an engine block 32 that at least partially defines a plurality of cylinders 34. A piston (not shown) may be slidably disposed within each cylinder 34 to reciprocate between a top-dead-center position and a bottom-dead-center position, and one or more cylinder heads (not shown) may be connected to engine block 32 to close off an end of each cylinder 34. Each cylinder 34, piston, and cylinder head may together define a combustion chamber. In the illustrated embodiment, engine 18 includes six such combustion chambers. However, it is contemplated that engine 18 may include a greater or lesser number of combustion chambers and that the combustion chambers may be disposed in an "in-line" configuration, in a "V" configuration, in an "opposing-piston" configuration, or in any other conventional configuration. Engine 18 may be equipped with an air induction system 36 and an exhaust system 38 that direct fluids into and out of the combustion chambers.

Air induction system 36 may include components configured to introduce charged air into cylinders 34. For example, air induction system 36 may include an intake manifold 40 fluidly connected along its length to each cylinder 34, one or more compressors 42 in fluid communication with intake manifold 40, and, in some embodiments, a cooler 44 located downstream of and/or in-between compressors 42. It is contemplated that additional components may be included within air induction system 36, if desired, such as valving, air cleaners, wastegates, control systems, bypass circuits, and other means for conditioning and introducing charged air into engine 18. It is also contemplated that compressor 42 and/or cooler 44 may be omitted, if desired.

In the disclosed embodiment, each compressor 42 of power system 10 is a fixed geometry centrifugal-type compressor that is mechanically driven to compress air flowing into cylinders 34 to a predetermined pressure level. It is contemplated, however, that another type of compressor may alternatively or additionally be used in conjunction with power system 10, if desired. Compressors 42, if more than one is included within air induction system 36, may be disposed in a series or parallel relationship, and fluidly connected to engine 18 via intake manifold 40.

Cooler 44 may embody a single-stage heat exchanger (shown in FIG. 2) or a dual-stage heat exchanger (shown in FIG. 3) and configured to facilitate the transfer of thermal energy away from the compressed air directed into cylinders 34 of engine 18. The thermal energy transferred away from the compressed air may be absorbed into a flow of coolant, for example air, glycol, water, a water/glycol mixture, a blended air mixture, or another coolant known in the art.

Exhaust system 38 may be configured to direct exhaust from cylinders 34 to the atmosphere. For example, exhaust system 38 may include an exhaust manifold 46 fluidly connected along its length to cylinders 34, and one or more turbines 48 in fluid communication with exhaust manifold 46. Turbines 48, if more than one is included within exhaust system 38, may be connected in a series or parallel relationship.

Each turbine 48 of exhaust system 38 may be mechanically connected to one or more compressors 42 of air induction system 36 by way of a shaft 50 to form a turbocharger 52. As the hot exhaust gases exiting cylinders 34 move through exhaust manifold 46 into turbine 48 and expand against blades thereof, turbine 48 may rotate and drive the connected compressors 42 to compress inlet air directed back into cylinders 34 via intake manifold 40.

In some embodiments, an exhaust gas recirculation (EGR) passage 54 may be connected between air induction and exhaust systems 36, 38. EGR passage 54 may allow a controlled amount of exhaust gas to be recycled within power system 10, thereby improving exhaust emissions of engine 18. In the disclosed embodiment, FOR passage 54 forms a low-pressure loop having an inlet located downstream of turbine 48 and an outlet located upstream of compressor 42. It is contemplated, however, that EGR passage 54 could alternatively form a high-pressure loop (i.e., a loop having its inlet located upstream of turbine 48 and its outlet located upstream or downstream of compressor 42), if desired. It is further contemplated that other flow-promoting devices (e.g., a blower, a venturi etc.) and/or exhaust conditioning devices (e.g., diesel oxidation catalyst, particulate filter, etc.) could be associated with EGR passage 54, if desired. It is also contemplated that a valve (not shown), for example a check valve or a reed valve, may be situated within EGR passage 54, if desired, to provide for a unidirectional flow of exhaust into air induction system 36.

An EGR cooler 56 may be located within EGR passage 54 to cool the recycled exhaust gas before it enters air induction system 36. EGR cooler 56, like cooler 44, may be a single-stage heat exchanger (shown in FIG. 2) or a dual stage heat exchanger (shown in FIG. 3), and be configured to facilitate the transfer of thermal energy away from the recycled exhaust. The thermal energy transferred away from the recycled exhaust may be absorbed into a flow of low-pressure coolant, for example air, glycol, water, a water/glycol mixture, a blended air mixture, or another coolant known in the art.

Power system 10 may include even more coolers in some embodiments. For example, power system 10 may include, among others, a jacket water cooler 58, jacket water cooler 58 may be a single-stage (shown in FIG. 2) or dual-stage (shown in FIG. 3) type of cooler configured to transfer heat away from a coolant passing through engine block 32. Other types of coolers may also or alternatively be used in conjunction with power system 10. The thermal energy transferred away from engine block 32 may be absorbed into a flow of coolant, for example air, glycol, water, a water/glycol mixture, a blended air mixture, or another coolant known in the art.

It should be noted, that when a particular heat exchanger (e.g., air cooler 44, EGR cooler 56, and/or jacket water cooler 58—see FIG. 2) is described as being a dual-stage heat exchanger, the particular heat exchanger may have multiple cores that are interconnected by way of an intermediate circuit. In particular, the intermediate circuit may connect the two cores to allow an intermediary coolant to transfer heat between the cores. In this embodiment, the intermediary coolant is isolated from any other fluids passing through the same cores.

As described above, the liquid fuel stored within tank 20 is vaporized before being stored in accumulator 24 and subsequently consumed by engine 18. The heat used to vaporize the fuel may be provided by way of one or more of the heat exchangers described above. For example, the liquid fuel may be directed through the heat exchanger(s) and function as the coolant, absorbing heat from the primary fluid (e.g., from the exhaust, air, or jacket water) and thereby cooling the primary fluid. In turn, this absorbed heat may function to vaporize the liquid fuel.

In a first instance, the liquid fuel is directed by pump 22 through a first supply passage 60 to only heat exchanger 56, and heat exchanger 56 may be thermally isolated from the other heat exchangers. As the liquid fuel passes through heat exchanger 56, the liquid fuel picks up enough heat to cause vaporization of the fuel prior to the fuel entering supply line 30 and being collected within accumulator 24.

In another instance, as the liquid fuel passes through heat exchanger 56, the liquid fuel picks up enough heat to cool the exhaust to a desired temperature before the exhaust is mixed with inlet air passing into compressor 42. In some embodiments, the heat absorbed during this process is also the same amount sufficient to vaporize the fuel. In other embodiments, however, additional heat may be required. When additional heat is required to fully vaporize the liquid fuel, the fuel may be directed in series to multiple heat exchangers. For example, the fuel may be directed from heat exchanger 56 to cooler 44 and/or to heat exchanger 58, prior to the vaporized fuel being collected within accumulator 24. Additionally or alternatively, even if the amount of heat absorbed within heat exchanger 56 is sufficient to fully vaporize the liquid fuel, the vaporized fuel exiting the heat exchanger may still have a low temperature. Thus, it may be possible for the vaporized fuel to function as the coolant inside additional heat exchangers, if desired.

When the fuel from pump 22 is passed through multiple heat exchangers in series, the order of the heat exchangers may be important. In particular, it may be important to pass the fuel through the hottest heat exchanger first. Thus, in the disclosed embodiment, the fuel may be passed through cooler 56 first, then cooler 58, and finally cooler 44. It is contemplated, however, that other strategies may alternatively be employed. For example, the fuel may be passed through the heat exchangers based on heat load rather than temperature, if desired.

In some embodiments, the fuel passing through a particular heat exchanger may not be sufficient to properly cool the primary fluid passing through the same heat exchanger. In these embodiments, an additional source of cooling may be required. For example, a fan 62 could be associated with one or all of coolers 44, 56, 58, if desired. Each heat exchanger may have its own dedicated fan 62 (shown in FIGS. 2 and 3) or be stacked together (e.g., in parallel or series) to receive a flow of air from a common fan 62, as desired. Fan 62 may be configured to force ambient air through the associated heat exchanger for additional heat transfer away from the primary fluid.

INDUSTRIAL APPLICABILITY

The disclosed power system may find potential application in any machine. The disclosed power system finds particular application in mobile gaseous fuel handling systems, such as are found in train consist 12. The disclosed power system may improve the efficiency of the system by using normally-wasted heat to vaporize liquid fuel. By recycling this heat, the energy associated with the heat may help reduce operational costs of the machine. In addition, the disclosed fluid flow arrangements ma provide for desired temperature control over the different flows.

It will be apparent to those skilled in the art that various modifications and variations can be made to the disclosed power system. Other embodiments will be apparent to those skilled in the art from consideration of the specification and practice of the disclosed concepts. It is intended that the specification and examples be considered as exemplary only, with a true scope being indicated by the following claims and their equivalents.

What is claimed is:

1. A power system, comprising:
a cryogenic tank configured to hold a supply of liquid fuel;
an engine configured to combust gaseous fuel;
a coolant circuit configured to cool the engine;
at least one heat exchanger isolated from the coolant circuit and configured to receive a fluid passing through the engine;
a first fuel line extending from the cryogenic tank to the at least one heat exchanger; and
a second fuel line extending from the at least one heat exchanger to the engine, wherein the engine has an intake manifold, an exhaust manifold, and an EGR passage extending from the exhaust manifold to the intake manifold such that the at least one heat exchanger is disposed in the EGR passage.

2. The power system of claim 1, wherein the fluid is exhaust.

3. The power system of claim 1, wherein:
the at least one heat exchanger includes a first core configured to receive the fluid, and a second core connected between the first and second fuel lines; and
the power system further includes an intermediary circuit connecting the first and second cores.

4. The power system of claim 1, wherein the fluid is air.

5. The power system of claim 1, wherein:
the at least one heat exchanger includes an EGR cooler; and
the power system further includes an air cooler; and
at least one of the first and second fuel lines is further configured to pass through the air cooler.

6. The power system of claim 1, wherein:
the at least one heat exchanger includes an EGR cooler;
the power system further includes an air cooler; and
the second fuel lines is configured to connect to the engine at a location downstream of the air cooler.

7. The power system of claim 1, further including an accumulator in fluid communication with the second fuel line.

8. The power system of claim 7, further including a regulator located downstream of the accumulator.

9. The power system of claim 1, wherein the at least one heat exchanger is configured to transfer an amount of heat from the fluid to liquid fuel from the first fuel line to vaporize the liquid fuel.

10. The power system of claim 1, further including a fan configured to force ambient air through the at least one heat exchanger for additional heat transfer.

* * * * *